US010269504B2

(12) United States Patent
Ervin (10) Patent No.: US 10,269,504 B2
(45) Date of Patent: Apr. 23, 2019

(54) SUPERCAPACITOR HAVING HOLES FORMED IN CARBONACEOUS ELECTRODES FOR INCREASING THE FREQUENCY OF OPERATION

(71) Applicant: U.S. Army Research Laboratory, Washington, DC (US)

(72) Inventor: Matthew H. Ervin, Clarksville, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 15/159,401

(22) Filed: May 19, 2016

(65) Prior Publication Data
US 2016/0268059 A1 Sep. 15, 2016

Related U.S. Application Data

(63) Continuation-in-part of application No. 14/328,128, filed on Jul. 10, 2014, now Pat. No. 9,466,435.

(51) Int. Cl.
*H01G 11/24* (2013.01)
*H01G 11/38* (2013.01)
(Continued)

(52) U.S. Cl.
CPC .............. *H01G 11/24* (2013.01); *H01G 11/26* (2013.01); *H01G 11/28* (2013.01); *H01G 11/32* (2013.01);
(Continued)

(58) Field of Classification Search
CPC ........ H01G 11/36; H01G 11/38; H01G 11/26; H01G 11/86
See application file for complete search history.

(56) References Cited

U.S. PATENT DOCUMENTS 3,486,940 A * 12/1969 Ruben ................ H01M 4/14
429/136
5,142,439 A * 8/1992 Huggett ................ H01G 4/38
174/72 B
(Continued)

FOREIGN PATENT DOCUMENTS

JP 03283523 A 12/1991
JP 04022117 A 1/1992
(Continued)

OTHER PUBLICATIONS

X. Zhang et al., "Graphene nanostructures toward clean energy technology applications," Energy Environ. vol. 1, 2012, pp. 317-336.
(Continued)

*Primary Examiner* — David M Sinclair
(74) *Attorney, Agent, or Firm* — Eric Brett Compton (57) ABSTRACT

A supercapacitor or electrochemical capacitor includes spaced apart electrodes which are separated from each other by a separator made of an electrically insulating material. Each electrode is formed of carbonaceous material and capable of being impregnated with a liquid electrolyte. Metal current collectors are provided on the sides of the electrodes opposite from the separator. The electrodes have holes or elongated orifices extending through the electrodes to reduce ionic impedance in order to produce faster charging and discharging of the device.

19 Claims, 9 Drawing Sheets

(51) Int. Cl.
*H01G 11/66* (2013.01)
*H01G 11/26* (2013.01)
*H01G 11/36* (2013.01)
*H01G 11/86* (2013.01)
*H01G 11/28* (2013.01)
*H01G 11/32* (2013.01)
*H01G 11/52* (2013.01)

(52) U.S. Cl.
CPC ............. *H01G 11/36* (2013.01); *H01G 11/38* (2013.01); *H01G 11/66* (2013.01); *H01G 11/86* (2013.01); *H01G 11/52* (2013.01); *Y02E 60/13* (2013.01)

(56) References Cited

U.S. PATENT DOCUMENTS

| | | | |
|---|---|---|---|
| 6,233,135 B1 | 5/2001 | Farahmandi et al. | |
| 6,621,686 B1 | 9/2003 | Jenn-Feng et al. | |
| 8,284,539 B2* | 10/2012 | Lu | H01G 11/24 361/502 |
| 9,315,680 B2* | 4/2016 | Uemura | C09D 5/24 |
| 2004/0214078 A1* | 10/2004 | Mitani | H01G 9/038 429/122 |
| 2005/0013094 A1* | 1/2005 | Reuter | H01B 1/127 361/525 |
| 2008/0013255 A1 | 1/2008 | Schneuwly | |
| 2008/0014504 A1 | 1/2008 | Schneuwly | |
| 2008/0192407 A1* | 8/2008 | Lu | H01G 11/24 361/502 |
| 2009/0262485 A1 | 10/2009 | Sakata et al. | |
| 2010/0226069 A1* | 9/2010 | Norieda | H01G 9/016 361/502 |
| 2010/0266898 A1* | 10/2010 | Yamamoto | H01G 9/016 429/220 |
| 2010/0310941 A1* | 12/2010 | Kumta | H01B 1/04 429/231.95 |
| 2011/0235240 A1 | 9/2011 | Lu et al. | |
| 2011/0255214 A1 | 10/2011 | Gruner et al. | |
| 2013/0224582 A1* | 8/2013 | Mehata | C23F 1/02 429/211 |
| 2013/0342963 A1 | 12/2013 | Besesty et al. | |
| 2014/0002960 A1 | 1/2014 | Tezuka et al. | |
| 2014/0030604 A1* | 1/2014 | Laor | H01G 9/025 429/235 |
| 2015/0002986 A1* | 1/2015 | Gardner | H01G 11/10 361/502 |
| 2015/0236389 A1* | 8/2015 | West | H01M 16/00 429/7 |
| 2016/0071646 A1* | 3/2016 | Brennecka | H01G 2/14 361/321.4 |

FOREIGN PATENT DOCUMENTS

| | | |
|---|---|---|
| JP | 05021013 A | 1/1993 |
| JP | 2011210995 A | 10/2011 |

OTHER PUBLICATIONS

C.-M. Chen et al., "Macroporous 'bubble' graphene film van template-directed ordered assembly for high-rate supercapacitors," Chemical Communications 48 (57), 7149-7151 (2012).

M. Beidaghi et al., "Electrostatic spray deposition of graphene nanoplatelets for high-power thin film supercapacitor electrodes," J Solid State Electrochem (2012) 16:3341-3348.

K. Sheng et al., "Ultrahigh-rate supercapacitor based on electrochemically reduced graphene oxide for ac line filtering," Sci. Reports, Vo. 2, 2012, pp. 1-5.

S. Zhang, "Graphene based supercapacitor fabricated by vacuum filtration deposition," Journal of Power Sources 206 (2012) 476-482.

L. Basirico and G. Lanzara, "Moving towards high-power, high-frequency and low-resistance CNT supercapacitors by tuning the CNT length, axial deformation and contact resistance," Nanotechnology 23 (2012) 305401.

J.R. Miller, et al., "Graphene Double-Layer Capacitor with ac Line-Filtering Performance," Science 24, vol. 329 (5999): 1637-1639, Sep. 2010.

J. R. Miller, "Introduction to electrochemical capacitor technology," IEEE Electrical Insulation Magazine, vol. 26, Issue 4, Jul.-Aug. 2010, pp. 40-47.

D. Pech et al., "Ultrahigh-power micrometer-sized supercapacitors based on onion-like carbon," Nature: Nanotechnology, 5, 651-654 (2010).

Vasile V. N. Obreja, "On the performance of supercapacitors with electrodes based on carbon nanotubes and carbon activated material—A review," Physica E: Low-dimensional Systems and Nanostructures, vol. 40, Issue 7, pp. 2596-2605 (2007).

A. G. Pandolfo and A. F. Hollenkamp, "Carbon properties and their role in supercapacitors," J. Power Sources, vol. 157, Issue 1 (2006), pp. 11-27.

Jaegar, Introduction to Microelectronic Fabrication, 2002, Prentice-Hall., Second Edition, p. 17-27.

Ervin, Matthew H., "Etching holes in graphene supercapacitor electrodes for faster performance," Nanotechnology vol. 26 Issue: 23 Article No. 234003. Published: May 21, 2015.

Jiantong Li and Mikael Ostling "Prevention of graphene restacking for performance boost of supercapacitors—a review" Crystals 2013, 3, 163-190; doi:10.3390/cryst3010163.

AVX BestCap® Ultra-low ESR High Power Pulse Supercapacitors brochure, AVX Corporation (Fountain Inn, SC) Available online at: http://catalogs.avx.com/BestCap.pdf (accessed Mar. 14, 2016).

MicroGrid® Precision Expanded Metal and Metal Foil product information, Dexmet Corp. (Wallingford, CT) Available online at: http://www.dexmet.com/Expanded-Metals.html (accessed Mar. 14, 2016).

McNichols® Quality Perforated—Round Hole Products, McNichols Co. (Tampa, FL). Available online at: http://www.mcnichols.com/products/perforated/round-hole/#none (accessed Mar. 14, 2016).

* cited by examiner

_Fig-4_

_Fig-5_ fig-6A fig-6B

SUPERCAPACITOR HAVING HOLES FORMED IN CARBONACEOUS ELECTRODES FOR INCREASING THE FREQUENCY OF OPERATION

RELATED APPLICATION DATA

This application is a continuation-in-part (CIP) of U.S. patent application Ser. No. 14/328,128 filed Jul. 10, 2014, the disclosure of which is hereby incorporated by reference in its entirety for all purposes.

GOVERNMENT INTEREST

The invention described herein may be manufactured, used, and licensed by or for the United States Government.

BACKGROUND OF THE INVENTION

I. Field of the Invention

The present invention relates generally to capacitors and, more particularly, to electrochemical capacitors also known as supercapacitors.

II. Description of Related Art

Capacitors have long been known and used in electronic circuitry for the storage of electrical energy. In its simplest form, the capacitor includes a pair of electrically conductive plates, typically constructed of metal, separated by air or a dielectric material. The size or area of the conductive plates as well as the permittivity and thickness of the dielectric material between the plates determines the magnitude of the capacitance of the capacitor.

Some previously-known capacitors include both electrostatic as well as electrolytic capacitors. Such capacitors have a relatively low capacitance, but are able to operate at voltages ranging from a few volts to thousands of volts. Furthermore, such capacitors are capable of operating at high frequencies.

More recently, electrochemical capacitors, also known as supercapacitors, have been developed which do not have a conventional dielectric. Instead, supercapacitor electrodes include a conductive plate, known as a current collector, which is coated with a carbon derivative material, such as activated carbon or graphene. These electrodes are typically separated from each other by an intervening separator made from a porous insulating material that prevents the electrical shorting of the electrodes, but allows electrolyte ions to move between the electrodes. In use, when subjected to a voltage, ions flow between the electrodes results in energy storage within the electrodes through the charge separation at the electrode surface with positive charges in one electrode attracting negative ions to that electrode's surface and with negative charges in the other electrode attracting positive ions to that electrode's surface.

A primary advantage of supercapacitors is that they are able to exhibit capacitances up to 10,000 times that of an electrolytic capacitor. Furthermore, such supercapacitors exhibit the greatest energy density of all currently known capacitors.

Figure 1:
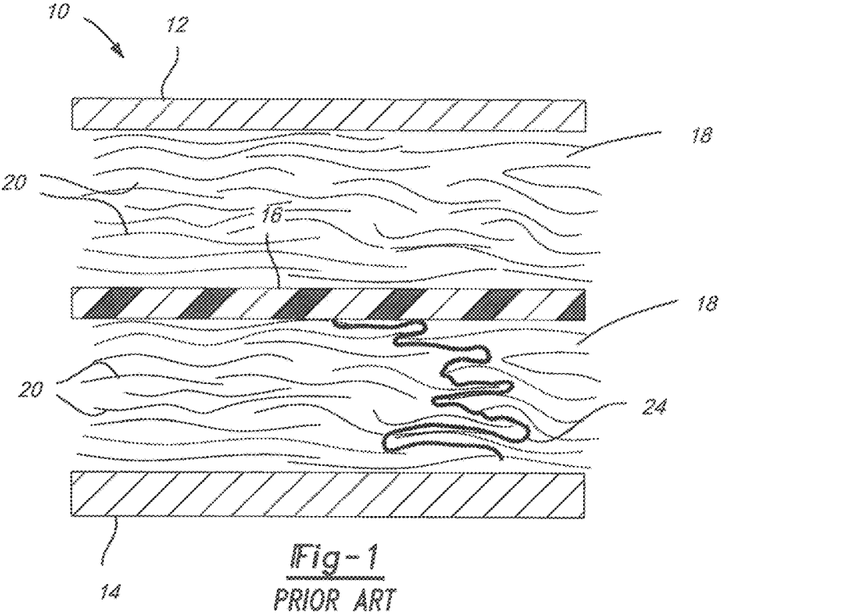
FIG. 1 is a fragmentary sectional view of a prior art supercapacitor and illustrating an exemplary travel of an electrolyte ion path through the electrode.

FIG. 1 shows a sectional view of a prior art supercapacitor 10. The supercapacitor 10 includes a pair of metal current collectors 12 and 14 which are spaced apart. A porous separator 16 made of an electrical insulating material is positioned in between the two metal current collectors 12 and 14. Electrodes 18, formed of carbonaceous material 20, such as activated carbon, carbon nanotubes, or graphene, are deposited on each current collector 12 and 14. The separator 16 and carbonaceous material 20 are impregnated with an electrolyte (not shown) containing mobile positive and negative ions.

During both charging and discharging of the prior art supercapacitor 10, electrolytic ions must travel between particles or flakes of the carbonaceous material 20 in order to access the full surface area of the electrodes 18 so as to store as much energy as the device can hold. Since the electrolytic ions cannot travel directly through the particles or flakes of carbonaceous material, the ions must travel around them. One exemplary long and tortuous path of an ion traveling through the particles or flakes of carbonaceous material 20 is shown at 24 and effectively increases the ionic impedance of the electrode.

Supercapacitors do, however, suffer from some disadvantages due, in part, to the extended path necessary for the ions to travel during both charge and discharge. First, the previously known supercapacitors were limited to operate at low frequencies, typically less than 1 Hertz. Such low frequencies, of course, limit their applications in electrical circuits.

A still further disadvantage of these previously known supercapacitors is that the rate of charging, as well as discharging, is relatively slow. This relatively slow charging and discharging of the supercapacitor is due primarily to the ionic impedance present in the carbon based electrodes used for the supercapacitor.

SUMMARY OF THE PRESENT INVENTION

The present invention provides a supercapacitor or electrochemical capacitor with reduced ionic impedance of the electrodes which greatly increases the frequency of operation as compared with the previously known supercapacitors. This means that supercapacitors according to embodiments of the present invention enjoy faster discharge and charging time compared with other previously known supercapacitors.

In brief, the supercapacitor comprises spaced apart electrodes which are separated from each other by a separator. The separator is made of an electrically insulating material, such as a porous material like a polymer.

Each of the electrodes is formed of carbonaceous material and capable of being impregnated with a liquid electrolyte. Metal or other conductive current collectors are provided on the sides of the electrodes opposite from the separator. The electrical energy storage is achieved by charge separation at the electrode carbonaceous material surfaces.

Unlike the previously known supercapacitors, according to embodiments of the present invention, holes are formed through the electrodes. The holes extend generally from the metal current collector and towards the separator, and may be aligned, preferably in a grid pattern. These holes within the electrodes facilitate the rapid travel of electrolyte ions through the electrode thickness. Thus, since the electrolyte ions travel throughout the electrodes during charging and discharging, more rapid charging and discharging of the supercapacitor is achieved.

Different methods may be used to form the holes through the electrodes. If the mesh is made of an insulating material then it may form the separator in the completed electrochemical capacitor. Or, if the mesh is made of a conducting material it may form the current collectors in the completed electrochemical capacitor. In one method, carbonaceous material of the electrode is deposited on a mesh current collector which can be done using various methods such as drop casting, doctor blading, air brushing, filtration, or similar. The mesh current collector has a very small pitch such as 1000 or 2000 lines per inch, and a low transmission percentage such as 5-10%. The latter is important as it prevents the electrode etching methods from removing too much of the carbonaceous material. Using the mesh current collector as a mask, the holes are milled through the carbonaceous material in a grid pattern using various methods such as ion milling or oxygen reactive ion etching that produce an anisotropic etch of the carbonaceous material. Alternatively, the mesh current collector could be used to mask a photochemical or photoelectrochemical etch of the carbon. Still another approach would be to use laser drilling of the holes in the layer of carbonaceous material. This method could be used to pattern the hole arrays in the electrodes without the need for a mesh current collector to mask the etch process. And, in yet other embodiments, a photolithographic approach with associated anisotropic etching could also be performed without the need for the mesh; rather the holes can be patterned using a resist material.

The provision of the holes through the electrodes effectively reduces the otherwise tortuous path of ions traveling through the electrode since the holes provide a direct or facilitated path through the carbonaceous material to access the full surface area of the electrode. This effectively reduces both charging and discharging time of the capacitor. The electrodes produced can be approximately 1-10 microns thick, for instance.

Or to put it another way, the supercapacitors according to embodiments of the present invention are able to operate at higher frequencies than the previously known supercapacitors. The capacitors may be configured to operate at a frequency in excess of about 1 Hz, and more preferably about 10 Hz.

In some embodiments of the invention, nanotubes and/or nanoparticles may be further intermixed with the carbonaceous material. The nanotubes or nanoparticles produce additional space between particles or flakes of the carbonaceous material making ionic transport within the electrode plane easier while the etched holes in the electrodes provide easier ionic transport perpendicular to the electrode plane. This combination, in turn, results in increased frequency of operation as well as increased discharge and charging speed for the supercapacitor by achieving reduced ionic impedance.

In other embodiments, the electrodes may have a plurality of elongated orifices extending through the carbonaceous material between the metal current collector and separator in a manner similar to holes. In either case, the holes or elongated orifices may be spaced apart no more than about 25.4 microns to create a facilitated pathway for travel of the electrolytic ions during charging and discharging of the capacitor thereby significantly increasing the operational frequency of the capacitor. For example, the holes may have a length/width or diameter of about 10 nm to 100 microns, and the elongated orifices may have a width of about 10 nm to about 100 microns. The size of the holes or elongated orifices and spacing may be judiciously selected so as to remove no more than about 50% of the carbonaceous material of the electrodes. The spacing of the holes or elongated orifices could be less than the thickness of the electrodes. Also, the length/width or diameter of the holes or the width of the elongated orifices may be larger than the interparticle pore size in the electrode material. The holes or elongated orifices can be patterned using a mesh placed on top of the carbonaceous material during their forming process. The electrodes can be created by depositing carbonaceous material on a mesh with the mesh also being used as a template for forming the holes or elongated orifices and/or for patterning the deposition of the carbonaceous material onto the current collectors.

BRIEF DESCRIPTION OF THE DRAWING

A better understanding of embodiments of the present invention will be had upon reference to the following detailed description, when read in conjunction with the accompanying drawing, wherein like reference characters refer to like parts throughout the several views, and in which.

DETAILED DESCRIPTION OF PREFERRED EMBODIMENTS OF THE PRESENT INVENTION

Figure 2:
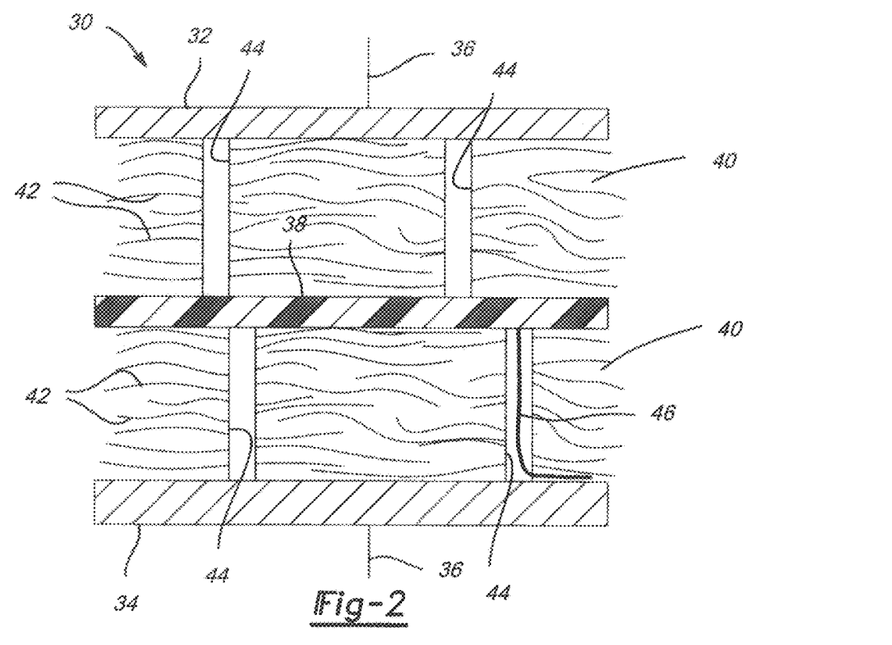
FIG. 2 is a fragmentary sectional view of a supercapacitor having holes in the electrodes according to an embodiment of the present invention and illustrating an exemplary travel of an electrolyte ion path through one hole in the electrode.

With reference first to FIG. 2, a first embodiment of a supercapacitor or electrochemical capacitor 30 according to the present invention is shown. Like the previously known supercapacitors of FIG. 1, the supercapacitor 30 generally includes a pair of spaced apart metal current collectors 32 and 34 which are spaced apart by a few microns to a few hundred microns and are parallel to each other. Each current collector 32 and 34 is connected to its associated electrical circuit (not shown) by a lead 36.

A separator 38 constructed of an electrical insulating material, such as a porous polymer, is positioned in between the metal current collectors 32 and 34 and thus separates a pair of electrodes 40 from each other. Any conventional material may be used for the separator 38. In some embodiments, the separator 38 may be a porous, electrically insulating polymer or paper film which keeps the electrodes 40 from electrically contacting and discharging, while allowing ions to diffuse from one electrode to the other. A liquid electrolyte, such as a salt solution or a room temperature ionic liquid, provides the ions that adsorb onto the electrodes 40 creating the charge separation that stores energy in the device.

The electrodes 40 are porous electric conductive electrodes which are impregnated with the liquid electrolyte (not shown) which provides a source of electrolytic ions. When bias voltage is applied between the two electrodes 40, positive charge at an exposed surface of one electrode attracts negative ions from the electrolyte and negative charge at an exposed surface of the other electrode attracts the positive ions from the electrolyte. Carbonaceous material 42 can be deposited or otherwise provided on the current collectors 32 and 34 to form porous material electrodes 40. For instance, a silk screening process may be used to deposit the carbonaceous material 42 in some embodiments.

The carbonaceous material 42 can include particles or flakes of a carbon-based material which can sufficiently conduct electric charge and is sufficiently porous for enabling electrolytic ions to flow in the electrodes 40, thus functioning as a supercapacitor. Such carbonaceous material may include, for example, graphene, carbon nanotubes (CNT), porous carbon, activated carbon (AC), or any combination thereof. For graphene, in particular, it may be applied as particles or flakes on the order of about 1 micron in diameter. The graphene particles or flakes will generally arrange parallel to the current collectors and bind together by van der Wales forces so as to form sheets in a stack. While two electrodes 40 are illustrated in the figures, it should be appreciated that additional electrodes can be stacked in a similar manner in keeping with the scope of the invention with a separator 38 provided between adjacent electrodes 40.

In some embodiments, the electrodes 40 may further include a binder, conductivity enhancing material (such as carbon-black) and/or pseudo capacitive materials (such as conductive polymers or oxides of transition metals) mixed with the carbonaceous material 42.

The carbonaceous material 42 thus provide the necessary storage surface area for the ions when the capacitor 30 is charged. Most conventional methods may be used to deposit the carbonaceous material 42 onto the current collectors 32 and 34.

Unlike the previously-known supercapacitors, however, holes 44, each having a diameter in the range of nanometers to microns, are formed through the electrodes 40. These holes 44 provide a pathway for travel of the electrolytic ions during charging and discharging of the capacitor 30. For example, an exemplary ion travel path 46 is illustrated in FIG. 2 in which ions travel not around each of the many layers of particles and flakes of the carbonaceous material 42 in the electrodes 40, but rather directly through the holes 44. As such, since ions travel a much less tortuous path 46 to go through the electrode thickness as compared to the prior art path 24 (FIG. 1). This effectively reduces the ionic impedance of the carbonaceous material 42 in the electrodes 40 to that required for traveling a short distance laterally in the electrode which enables faster charging and discharging of the capacitor 30 which is also seen as an increased operational frequency.

Although only two holes 44 are illustrated through the electrodes 40 in FIG. 2, it will be appreciated that typically there will be many holes 44 formed through the electrodes 40, preferably in an orthogonal grid pattern. For example, in one embodiment, a hole 44 is provided approximately every 9-13 microns in a grid pattern so that the holes 44 constitute about 8% of the overall area of one side of the electrode 40. This configuration of holes 44 is not to be construed as limiting and it should be appreciated that other hole patterns and configurations are contemplated.

Furthermore, the faster travel of the electrolytic ions through the carbonaceous material 42 of the electrodes 40 due to the holes 44 enables higher frequency of operation for the supercapacitor 30 than with the previously known supercapacitors. The inventor has demonstrated a 100-fold increase in speed (e.g., 0.1 Hz to about 10 Hz) in experiments with the inclusion of holes 44 in the supercapacitor 30. This is a significant improvement in the operating range compared to conventional supercapacitors having which operate typically less than 1 Hz.

Figure 3A:
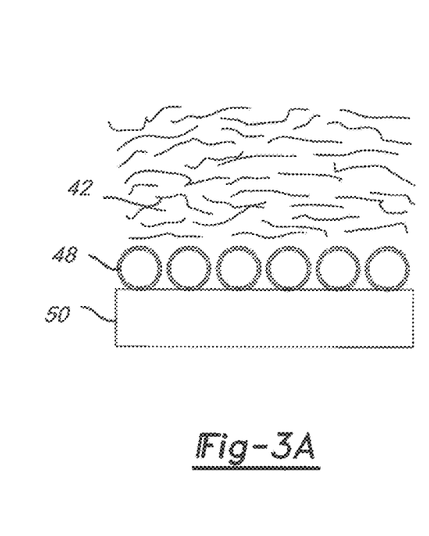
FIGS. 3A, 3B, and 3C are diagrammatic views illustrating one method of manufacture of the supercapacitor according to an embodiment of the present invention.
Figure 3B:
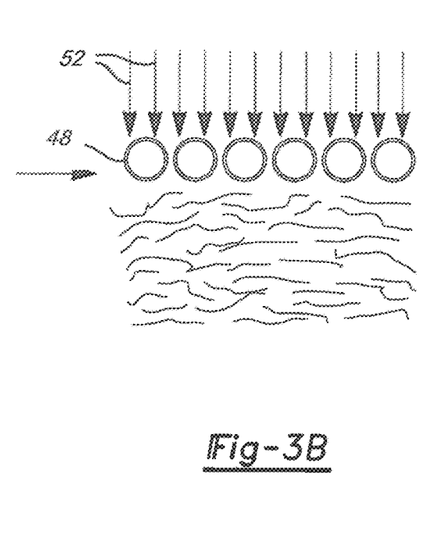
Figure 3C:
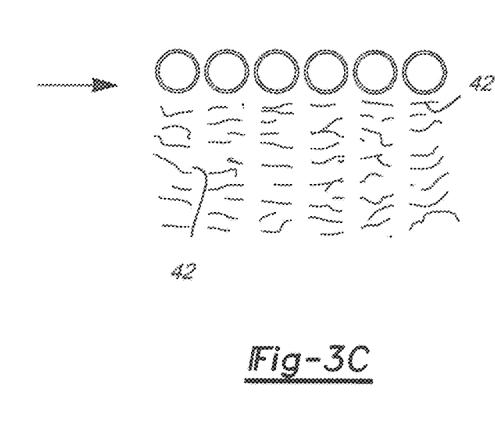

With reference now to FIGS. 3A-3C, one method of creating the holes 44 through the carbonaceous material 42 of the electrodes 40 is illustrated. In FIG. 3A, particles or flakes of carbonaceous material 42 are deposited on a mesh 48 using one of many conventional methods, such as by filtration or air brushing. A layer of filter paper or other appropriate barrier 50 covers the opposite side of the mesh 48 to keep too much carbonaceous material 42 from passing through the mesh and being lost.

With reference now to FIG. 3B, after the carbonaceous material 42 has been deposited on the mesh 48, the filter paper 50 is removed. The mesh 48 is then subjected to an anisotropic etch such as oxygen reactive ion etching (RIE) or argon ion milling, indicated by incident etching particles 52, such as oxygen ions, which etches, mills or abrades the holes 44 in the carbonaceous material 42 as shown in FIG. 3C. For some materials, RIE may be a better choice than the ion milling because ion milling is less selective and therefore etches the mesh more for a given amount of graphene etching.

Figure 4:
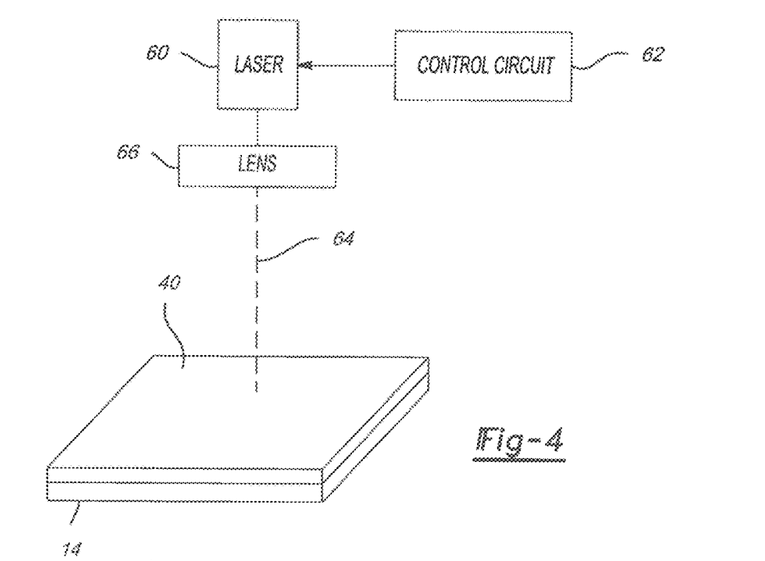
FIG. 4 depicts alternative method of creating an array of holes in the electrode according to another embodiment of the present invention.

With reference now to FIG. 4, an alternative method for forming the holes 44 through the electrodes 40 is shown. The carbonaceous material 42 forming an electrode 40 is first deposited on the metal current collector 14 in any conventional fashion, such as doctor blading or air brushing. The metal collector 14 is then positioned beneath a laser 60 so that the electrode 40 faces the laser 60. The laser 60 is then activated under control of a control circuit 62 to drill holes through the electrode 40 by a laser beam 64. The control circuit controls the positioning of the beam from the laser 60, either directly or through a lens system 66, or the position of the electrode 40, to vary the position of the laser beam 64 on the electrode 40 and preferably create the same grid pattern as with the ion milling depicted in FIGS. 3A-3C.

In other embodiments, a photolithographic approach with associated anisotropic etching could also be performed without the need for the mesh; rather the holes 44 can be patterned in the electrodes 40 using a resist material.

Figure 5:
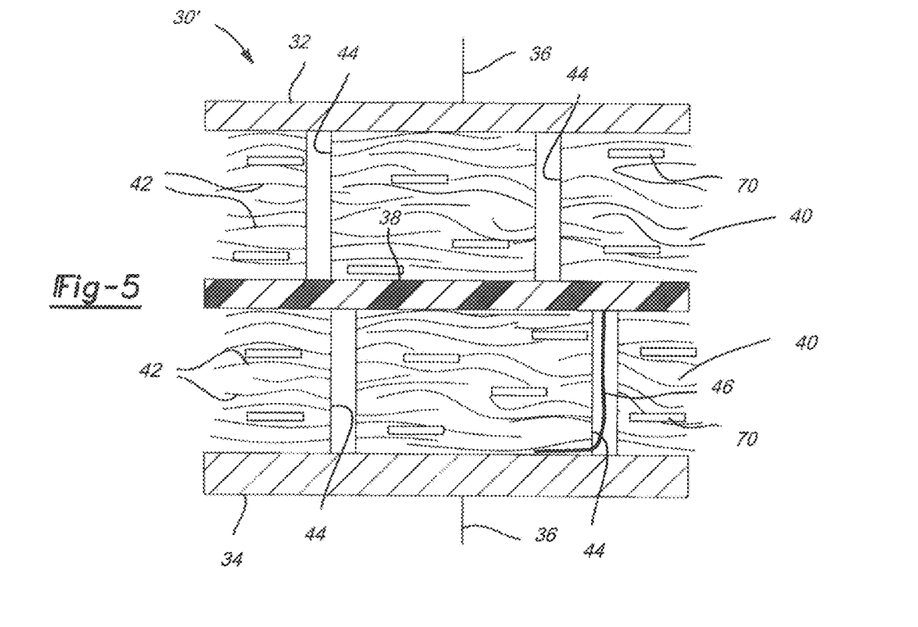
FIG. 5 illustrates another supercapacitor according to a further embodiment of the present invention.

With reference now to FIG. 5, another embodiment of a supercapacitor 30' is shown. Unlike the previously described embodiment of the present invention, in the supercapacitor 30' of FIG. 5, a plurality of nanotubes 70 or nanoparticles and/or nanowires having a diameter of nanometers to microns, are intermixed with the carbonaceous material 42 forming the electrodes 40. The nanotubes 70 may extend generally in a direction parallel to the metal current collector 14 and the separator 38. These nanotubes or nanoparticles 70 prop the carbonaceous material 42 apart providing wider passageways or pores for the electrolytic ions to travel laterally away from or to the etched holes 44 that provide easy ion transport in the direction perpendicular to the current collector, as shown by an exemplary path 44 which is shorter than the more tortuous path 24 (FIG. 1) of the prior art. As previously discussed, this lowers the ionic impedance (and perhaps the electronic impedance of the electrode) and results in reduced charging and discharging time for the supercapacitor as well as increased operating frequency for the supercapacitor.

Figure 6A:
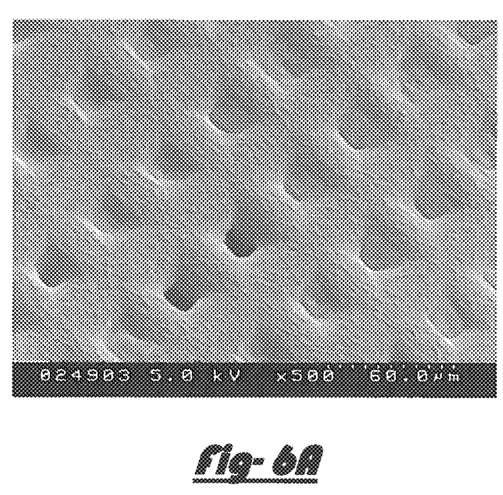
FIGS. 6A and 6B are scanning electron microscope (SEM) images of holes etched through a graphene electrode.
Figure 6B:
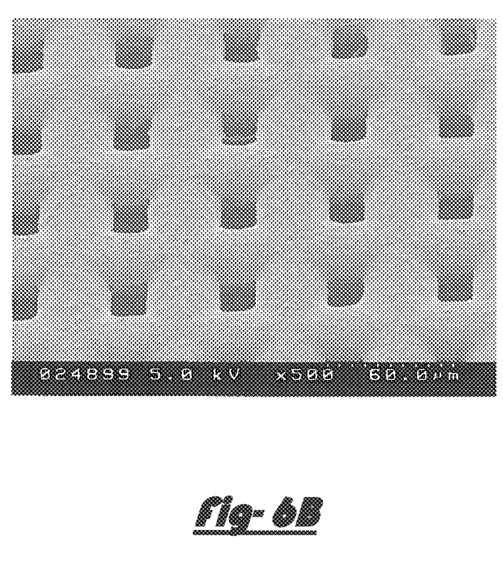

FIGS. 6A and 6B are images of holes etched through a graphene electrode. FIG. 6A is a scanning electron microscope (SEM) image of graphene filtered onto a metal mesh. Some of the graphene did not span a few of the holes; thus, those appear open. FIG. 6B is a SEM image of a graphene electrode after holes have been etched through it. The mesh has a square pattern and thus the holes are square, but it should be appreciated that other mesh shapes and sizes can be used. The hole size is the length/width for the square holes. These square holes are approximately 15×15 microns on a 50 micron pitch. For circular holes, diameter would be of interest.

These holes have been demonstrated to increase the speed with which the supercapacitor can charge or discharge by reducing the ionic impedance. These etched holes will increase the speed of the electrode. This results in increased power performance while retaining acceptable capacitance, and this will enable new applications for electrochemical capacitors and supercapacitors using a manufacturable approach.

Figure 7:
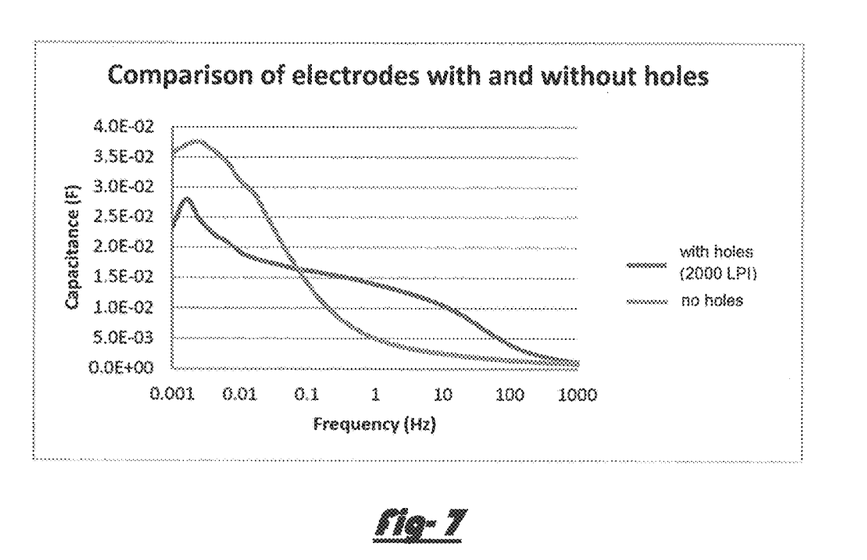
FIG. 7 is a plot showing capacitance versus frequency for identical electrodes with and without holes.

FIG. 7 is a plot showing capacitance versus frequency for identical electrodes with and without holes. The holes in the one electrode were nominally 7.6×7.6 microns with a 12.7 micron pitch. The high speed performance can be seen in the plot of capacitance as a function of frequency for two electrodes that differ only in that one of them has had holes etched through it. While the overall capacitance is somewhat lower for frequencies less than 0.1 Hz due to material removal during the milling and electrode mass variations, capacitance is retained to frequencies that are two orders of magnitude higher. The improvement is quite apparent for frequencies above about 0.1 Hz.

It has been found that improved frequency performance of the described electrochemical capacitors is due, not only to the provision of holes in the electrodes, but also on their size and especially spacing.

The hole sizes should be significantly larger than the inter-particle spacing within the electrode active material. In this way, they provide paths for the electrolyte ions to much more easily travel through the electrode thickness. However, the holes should not be so large as to unnecessarily remove an excessive amount of the electrode material when formed. Manufacturing limitations and the hole spacing will also influence the size of the holes used; hole diameters (or hole length/width) may range from about 10 nm to 100 microns, for example. The hole spacing sets an upper limit on the hole size since the overlapping of holes must be avoided. In addition, the hole sizes should be significantly smaller than the hole spacing so that an excessive amount of the electrode active material will not be lost to the etch.

The hole spacing (or pitch) has been found by the inventor to be an important parameter with respect to improving the frequency response, speed and capacitance of the capacitors. In the art, the pitch may be reported as the distance between hole centers and it is inversely reported in terms such as holes per inch, lines per inch, or wires per inch, for instance. More particularly, a small spacing between holes decreases the lateral distance through the electrode active material that the electrolyte ions must travel in order to access all of the electrode's available surface area to achieve full (dis)charge. This increases the operational frequency of the capacitor by increasing the ionic conductance of the electrode. These findings are supported by experimental data which shows significant improvement of the frequency performance of electrochemical capacitors by decreasing the pitch of the spaced apart holes in the active electrode material.

To perform testing on the effect of hole spacing on capacitor frequency performance, samples were made using commercially-available metal meshes having different hole pitches given in lines per inch (LPI). The metal meshes were electroformed nickel mesh with a thin gold coating obtained from Precision Eforming LLC of Cortland, N.Y. (http://www.precisioneforming.com). Electrodes with no holes (LPI of 0) and with meshes having hole pitches of 500, 1000 and 2000 LPIs were formed. The holes in these meshes were square shaped. As the LPI values increases, the hole spacing and size decrease to accommodate the increasing number of holes per inch.

To prepare the samples, a fixed amount of 2 mg/ml graphene oxide solution was filtered onto metal meshes of different LPIs. The graphene oxide was then thermally annealed to reduce it to conductive graphene. The metal meshes were used to mask the reactive-ion etching of holes through the graphene electrodes and as the current collectors for the graphene electrode devices, which used potassium hydroxide electrolyte. The electrode samples were then characterized using electrochemical impedance spectroscopy (EIS). The frequency at which a phase angle of −45 degrees was reached was used as the characteristic frequency of the electrode as is common practice. (Note: a perfect capacitor has a phase angle of −90° and a perfect resistor has a phase angle of 0°).

Figure 8:
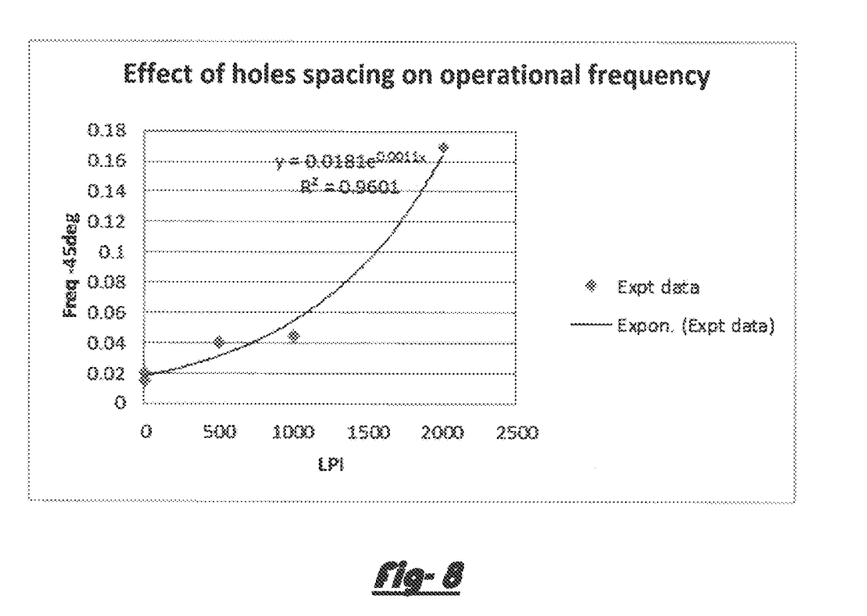
FIG. 8 is a plot showing the effect of holes spacing on operational frequency.

The tabulated results for the data are included in Table 1 and plotted in FIG. 8. The values in Table 1 are particular to the specific electrode material, thickness, and/or porosity, among others. In any event, as apparent from this plot, there is a clear trend between decreasing hole pitch (increasing lines per inch—LPI) and increased frequency performance of the capacitor.

TABLE 1

| | | Plot Data | | |
|---|---|---|---|---|
| Sample # | Mesh lines per inch | Hole Pitch (microns) | Hole Size (microns) | Measured Frequency (Hz) for −45 deg. phase angle |
| 1 | No holes | NA | NA | 0.02 |
| 2 | 500 | 50.8 | 39.1 | 0.04 |
| 3 | 1000 | 25.4 | 18.0 | 0.045 |
| 4 | 2000 | 12.7 | 7.62 | 0.17 |

There is little appreciable benefit, for these particular electrodes, in terms of frequency performance until the hole pitch is somewhat smaller than achieved with a 1000 LPI mesh (<<0.001" or 25.4 microns hole spacing). In particular, there is little change in measured frequency for −45 degree phase angle for pitches of 0, 500 and 1000 LPI; all are below 0.05 Hz. After about 1000 LPI, the exponential nature of improved frequency is quite apparent. Indeed, at 2000 LPI, it jumps considerably up to 0.17 Hz, i.e., a 8.5 times improvement over the no holes case. And as the trend suggests, this improvement should continue for even smaller spacings (i.e., LPI>2000).

The performance of electrodes with holes will vary as a function of hole pitch in a manner that will depend on the nature of the electrode active material porosity and thickness. If the electrode material has similar ionic conductivity in all directions (as would be expected with randomly packed spherical particles, for instance) then a speed increase would be expected as the hole pitch becomes smaller than twice the electrode active material thickness. This is assuming one half the hole pitch approximately represents the lateral distance the ions will need to travel through the porous electrode material as is the case when the hole size/diameters are significantly less than the hole pitch. In this way, the electrolyte ions can reach the most remote parts of the electrode material while passing a shorter distance through the porous electrode material than if the holes were not there. Without the holes the ions must pass through the full electrode thickness while being impeded by the small electrode active material inter-particle pores. With the holes, the ions may easily pass through the high ionic conductivity holes through the electrode thickness before traveling laterally through the porous electrode material for a shorter distance than if they had to travel through the full electrode material thickness. This results in a more ionically conductive path overall for the electrolyte ions to travel, thus increasing the speed of the electrode performance.

There have been many conventional approaches investigated for making higher speed electrodes without holes. One approach is to simply make the active electrode material layers thinner. In this way, the ions have to diffuse a shorter distance to reach all of the electrode surface area, and there is less electrical resistance since there is a shorter path to the current collector. Unfortunately, this approach is costly from a specific capacitance (capacitance per device mass or volume) perspective. Making the electrode layer thinner reduces the capacitance while the separator, current collector and packaging mass and volume remain unchanged so that the final device has reduced specific capacitance and energy. Commercial devices typically have electrode layer thicknesses that are on the order of about 100 microns to achieve acceptable specific capacitances for the fully packaged devices.

Figure 9:
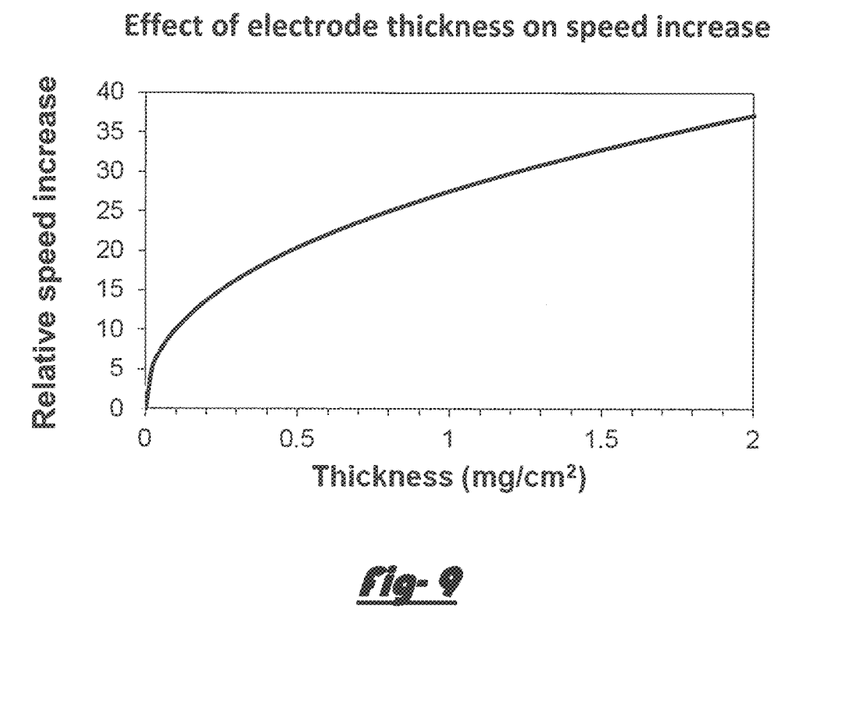
FIG. 9 is a plot showing the relative speed increase obtained with holes etched with a 2000 LPI mesh as a function of electrode thickness.

FIG. 9 shows the relative speed increase obtained with holes etched with a 2000 LPI mesh as a function of electrode thickness given in units of mg/cm$^2$. These thickness values linearly relate to length. For this particular material, deposited in this manner, it is approximately 5 microns thick per mg/cm$^2$. Other materials will have different conversion factors. The plot shows there is a logarithmic growth in relative speed as a function of thickness. The speed increase is related to the particular hole size and spacing. For 2000 LPI spaced holes, for instance, the spacing becomes a smaller percentage of the electrode thickness as the electrode thickness is increased. As is shown in this plot, the speed increase is greater for the thicker electrodes as the hole pitch becomes relatively smaller when compared to the electrode thickness.

It should be noted that, while the relative speed increase is greater for the thicker electrodes (for this fixed hole pitch spacing), the absolute speed of the thicker electrodes is actually slower since the ions still experience some resistance traveling through the holes and this resistance is greater for the deeper holes in the thicker electrodes. For thicker electrodes, they are starting at a slower speed but that speed is increased by a larger factor (though the resulting speed is still slower than what is achieved for the thinner electrodes). The addition of holes may enable thicker electrodes with similar speeds, although forming holes in thicker electrode material may present difficulties for fabrication. But by using thinner electrodes, thinner and smaller capacitors are possible. Thus, the electrodes 40 with holes formed therein may be approximately 1-10 microns thick, for instance, in some embodiments. Commercial electrodes are believed to be thicker and could certainly have holes formed therein according to other embodiments.

The situation may be somewhat more complicated when the ionic conductivity of the electrode material is not the same in all directions, as is the case for the graphene electrodes demonstrated here. In this case, the graphene sheets tend to deposit roughly parallel to the current collector (mesh) plane. This results in greater ionic conductivity in the plane parallel to the current collector since there are more pores aligned in the plane. The ionic conductivity in the direction perpendicular to the current collector (through the electrode material thickness) is relatively reduced as the graphene sheets tend to block ion travel in that direction. A difference between the lateral (i.e., in the plane of the electrode) and the perpendicular (i.e., through the electrode thickness) ionic conductivity will result in a different hole pitch requirement before significant speed improvements may be achieved. If the lateral ionic conductivity is a factor of "x" times greater than in the perpendicular direction, then a performance increase would be expected approximately when the hole pitch is less than twice the electrode thickness times "x". That is because perpendicularly traveling through the electrode thickness would have a similar ionic impedance compared to laterally traveling through a distance equal to "x" times the electrode thickness. Practically speaking, this means that for an electrode material that has worse ionic conductivity in the perpendicular direction than in the lateral direction, there should be an observable benefit from the holes with a spacing or pitch that is greater than the electrode thickness (again assuming that the hole sizes are much smaller than the pitch).

Figure 10:
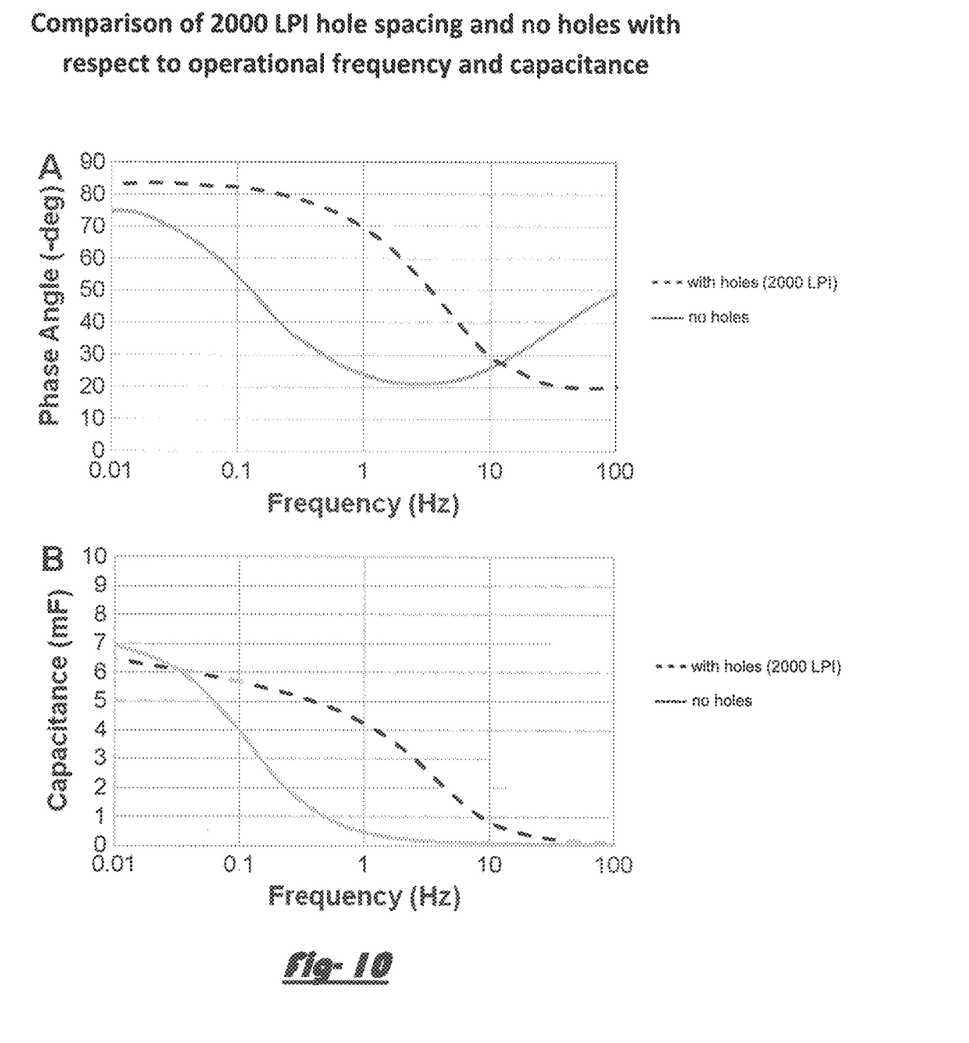
FIG. 10 shows plots of the EIS measured phase angle and capacitance for identical electrodes made without holes and with holes over a broad range of frequencies.

FIG. 10 shows plots of the EIS measured phase angle and capacitance for identical electrodes made without holes (solid line) and with holes (dotted line) over a broad range of frequencies. The holes were made using the 2000 LPI mesh from Precision Eforming. As the data in plot A shows, the electrode with holes shows much faster performance with a −45° phase angle at approximately 25 times greater frequency compared to the electrode without holes. The EIS data values in Table 1, above, and where the lines in plot A cross −45 degrees are not the same, since the two sets of electrodes were of different thicknesses and thus yield different results.

Plot B shows the Bode plot of capacitance versus frequency for the same two electrodes in Plot A. These two devices do not have identical capacitances at low frequency, in part due to the removal of carbonaceous material in forming the holes and error associated with cutting the original electrodes into smaller pieces for testing. However, it can be seen that the electrode device having the holes attains 4 mF of capacitance at greater than 10 times the frequency of the electrode device without holes. The operational frequency to attain 1 mF has been increased to almost 10 Hz.

Of course, there are tradeoffs in terms of operational performance. For instance, larger and more closely spaced holes will yield the lowest ionic impedance and fastest speed, but they will also cost the most in reduced capacitance as a larger fraction of the initial electrode material will be removed when forming the holes. An optimum hole size and spacing would have to be determined for a given application and electrode thickness/porosity. The actual frequency of operation and the degree of speed increase with the inclusion of the holes through the electrodes is dependent mostly on the pitch of the holes and to a lesser degree on the size of the holes.

The manufacturing of the capacitor may be greatly simplified in various embodiments. The mesh 48 may serve multiple purposes. More particularly, according to an embodiment, the same mesh 48 can serve as the substrate for the electrode active material deposition (see FIG. 3A), the mask 48 for forming the holes 44 through the electrode active material 42 (see FIG. 3B), and as the current collector 32 or 34 for the resulting electrodes 40 (see FIG. 2) in the completed electrochemical capacitor 30. This can greatly increase manufacturing speed and thus efficiently, by using the same element for disparate processing steps. As a current collector 32, 34, the mesh 48 should be formed of an electrically conducting material (such as metal) which is sufficient for providing conductive paths into and out of the electrodes 40. The current collector does not have to be very thick to carry the current, it is more important that it is thick enough to withstand the etch and have sufficient mechanical strength for assembling and use of the capacitor. A thickness of 2.7 microns thick was used in the work here, but the mesh thickness required for a particular embodiment will depend on the etch conditions and time for the given electrode material and thickness. The holes 44 extend through the electrode active material layers 42 and may or may not extend through the current collector 32, 34; this is because holes are not a requirement for (nor do they inhibit) operation as current collectors. Thus, while a mesh current collector can help make the holes, for operational purposes, the current collectors could be solid.

Alternatively, the electrode active material 42 could be deposited onto one or both of the current collectors 32, 34 with the mesh 48 placed on top of the active electrode material 42 during the hole forming process, with the mesh 48 removed after the holes 44 are formed. The mesh 48 in this embodiment may be made of various materials including, metal, ceramic, or polymer, for example, as it is only used for manufacturing here.

Although, if the mesh 48 is made of an insulating material, it could be left in place to serve as the separator 38 in the completed electrochemical capacitor 30. As the separator 38, the mesh 48 needs to be thick enough to prevent electrical contact between the electrodes 40, which is not very thick at these voltages. It also needs to be mechanically strong enough for assembly and use. It may also need to be thick enough that active electrode material cannot create an electrically conductive path through the pores so that smaller pores would be better.

In other embodiments, the mask 48 may be used to deposit and pattern the electrode material 42 through, using a method analogous to silk screening, in order to form islands or lines of a width similar to the hole pitches discussed above (<100 microns) of electrode active material 42. The islands or lines may be generally parallel to one another. In this case, instead of the standard circular or square holes, discussed in detail above, closely spaced elongated orifices (e.g., 10 nm-100 micron apart) of width less 100 microns could be formed through the electrode active material 42 similar to holes to leave lines of electrode material with widths on the order of the hole spacing or pitches described above and obeying similar relationships to the electrode material thickness/porosity.

The holes 44 may be standard circular or square holes which are typically for many commercially-available mesh materials. Since holes are typically formed with regular spacing there between, such as in a rectilinear grid pattern, the pitch may refer to the distance present between holes centers of adjacent rows or columns. This approximates the electrode active material as series of lines or islands 45 separated by the rows and/or columns of holes.

Alternatively, spaced apart elongated orifices 54 could be used instead of rows (or columns) of holes 44 to provide a series separated lines of islands 55. The elongated orifices may be generally rectangular in shape, for instance. The mask 48 may be used to deposit and pattern the electrode material 42 through in order to form islands or lines of a width similar to the hole pitches discussed above (e.g., <100 microns) of electrode active material 42. In this case, instead of the standard circular or square holes, discussed in detail above, the closely spaced elongated orifices (e.g., 10 nm-100 micron apart) of width less than about 100 microns (e.g., 10 nm-100 micron) could be formed through the electrode active material 42 similar to holes to leave lines of electrode material with widths on the order of the hole spacing or pitches described above and obeying similar relationships to the electrode material thickness/porosity. The length of elongated orifices 54 is not so critical.

Figure 11A:
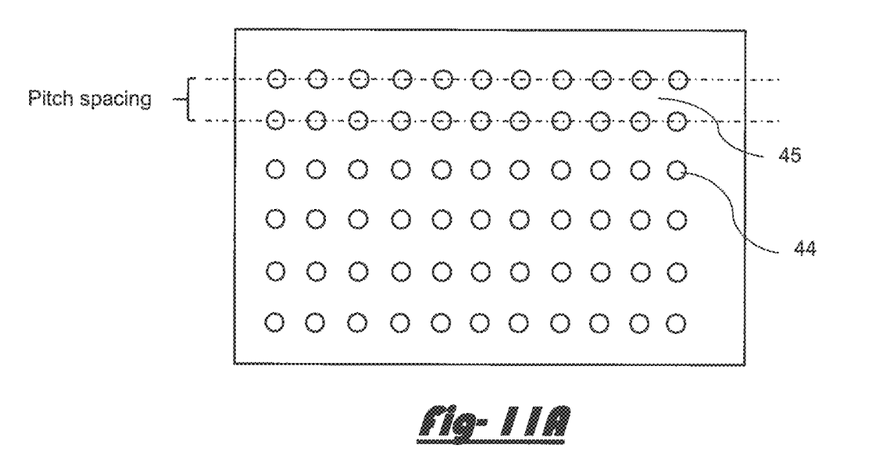
FIGS. 11A and 11B compare standard circular holes and elongated orifices forming islands or lines of electrode material of approximately the same pitch.
Figure 11B:
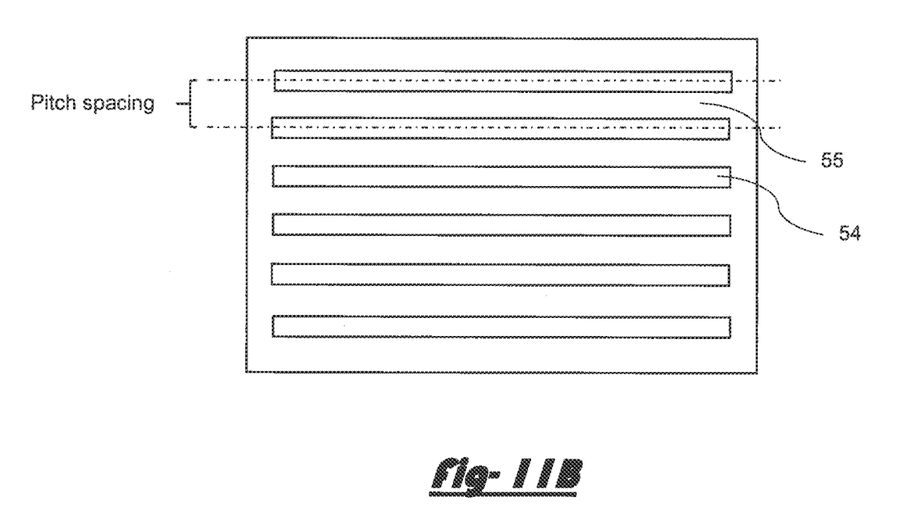

FIG. 11 compares standard circular holes (FIG. 11A) and elongated orifices (FIG. 11B) forming islands or lines of electrode material of approximately the same pitch. The performance of the two arrangements are similarly expected based on the aforementioned dimensions.

The electrode 40 includes small pores which give the material more surface area for the electrolyte and therefore capacitance. They also allow the electrolyte to access the surface area to realize the capacitance. The interparticle spacing/pores varies with electrode material and composition, but may be somewhere in the range of about 10 nm to 10 microns, for many carbonaceous materials. The holes 44 should be larger than the interparticle pore size in the electrode active material 42. The hole size may be influenced by the manufacturing limitations, the hole pitch, and the electrode active material thickness and porosity, as discussed herein.

Figure 12:
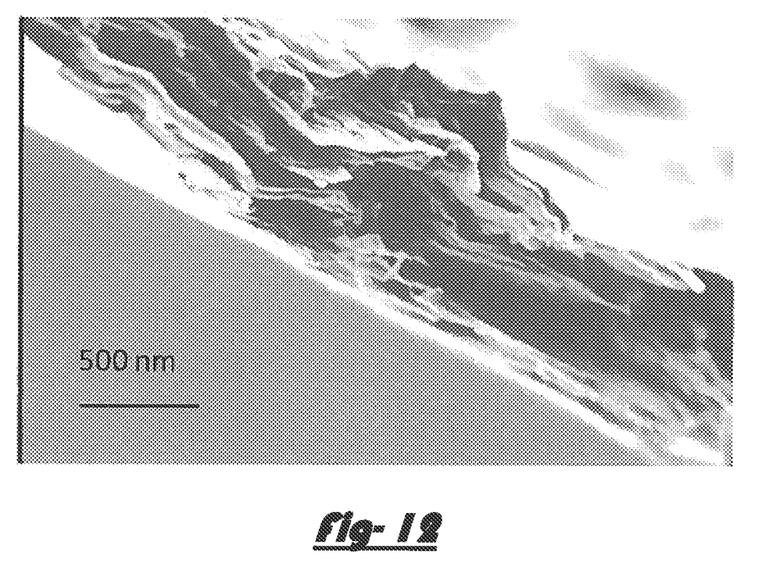
FIG. 12 is a SEM image of a graphene electrode showing a cross-sectional view of a stacked sheet structure.

FIG. 12 is a cross-sectional SEM image of a graphene electrode showing a stacked sheet structure. Graphene is formed of a single atomic layer of graphite. It is highly conductive and has the most surface area possible since all the atoms are surface atoms. The capacitance of a supercapacitor is related to the electrode surface area accessible to the electrolyte. When graphene is deposited onto metal current collectors 32, 34, the individual graphene sheets tend to lay flat on the surface resulting in a stack of horizontal graphene sheets. Upon charging, the electrolyte ions must diffuse through this random stack of graphene sheets to reach the inner most electrode surface area. The sizes of the spaces, or pores, between the graphene sheets, or other electrode materials plays a part in the operation. On one hand, an electrode with very small pores can have the highest surface area, and therefore capacitance, but small pores provide more resistance to the diffusion of electrolyte ions, so the resulting device is slower. On the other hand, large pores increase the device speed, but reduce the specific capacitance by decreasing the electrode surface area and by requiring excess electrolyte to fill the pores. In a completed electrochemical capacitor, according to embodiments, there should be an appropriate distribution of large etched holes through the electrode, for reduced ionic impedance, and small pores for sufficient specific capacitance.

The hole pitch required for increasing the speed of the electrodes/devices is related to the electrode thickness and the relative ionic conductivity laterally within and perpendicularly through the electrode active material thickness. Overall, the smaller the hole pitch the faster the achieved performance will be. However, pitches smaller than the electrode material thickness (multiplied by a factor representing the ratio of the ionic conductivity perpendicular to the electrode material thickness versus that parallel within the electrode thickness, if appropriate) will be needed for significant benefits to be achieved.

The hole diameters and pitches should be selected so as to not remove an excessive amount of electrode active material 42 in forming the holes 44 (FIG. 3C), typically removing less than 50%.

Aspects related to the invention have been previously disclosed in the following publication: Ervin, Matthew H., "Etching holes in graphene supercapacitor electrodes for faster performance," Nanotechnology 26 (2015) 234003 (9pp), which published online on May 21, 2015, the disclosure of which is hereby incorporated by reference in its entirety.

From the foregoing, it can be seen that the present invention provides a supercapacitor which enjoys improved charge and discharge times as compared to the other previously known supercapacitors by reducing the ionic impedance of the supercapacitor. Such reduction also results in increased frequency operation for the supercapacitor.

Having described my invention, however, many modifications thereto will become apparent to those skilled in the art to which it pertains without deviation from the spirit of the invention as defined by the scope of the appended claims.

I claim:

1. An electrochemical capacitor comprising:
    spaced apart electrodes separated by a separator made of a porous electrically insulating material, each of said electrodes formed of a porous carbonaceous material and capable of being impregnated with a liquid electrolyte; and
    a pair of metal current collectors on the sides of said electrodes opposite from said separator,
    said electrodes having a plurality of spaced apart holes or elongated orifices extending through the porous carbonaceous material between said metal current collector and said separator,
    wherein the length/width or diameter of the holes or the width of the elongated orifices are larger than an interparticle pore size in the electrode material,
    wherein the holes or elongated orifices are spaced apart less than 25.4 microns to create a facilitated pathway for travel of the electrolytic ions during charging and discharging of the capacitor thereby significantly increasing the operational frequency of the capacitor, and
    the spacing of the holes or elongated orifices are configured to reduce the ionic impedance of the porous carbonaceous material within the electrode material thickness.

2. The capacitor as defined in claim 1, wherein said holes or said elongated orifices are evenly spaced from each other in a grid pattern.

3. The capacitor as defined in claim 1, wherein said holes have a length/width or diameter of about 10 nm to 100 microns, and said elongated orifices have a width of about 10 nm to about 100 microns.

4. The capacitor as defined in claim 1, wherein the size of the holes or elongated orifices and spacing are selected so as to remove no more than about 50% of the porous carbonaceous material of the electrodes.

5. The capacitor as defined in claim 1, wherein the spacing of the holes or elongated orifices is less than the thickness of the electrodes.

6. The capacitor as defined in claim 1, wherein the holes or elongated orifices do not extend through the current collector.

7. The capacitor as defined in claim 1, wherein the holes or elongated orifices have a pitch in excess of about 1000 lines per inch.

8. The capacitor as defined in claim 1, wherein the capacitor is configured to operate at a frequency in excess of about 1 Hz.

9. The capacitor as defined in claim 1, further comprising a plurality of nanotubes, nanoparticles, and/or nanowires intermixed with said porous carbonaceous material forming the electrodes.

10. The capacitor as defined in claim 1, wherein said porous carbonaceous material comprises: graphene, carbon nanotubes, porous carbon, activated carbon, or any combination thereof.

11. The capacitor as defined in claim 1, wherein said porous carbonaceous material further comprises: a binder, conductivity enhancing material, a pseudo-capacitive material, or any combination thereof.

12. The capacitor as defined in claim 1, wherein the electrodes are approximately 1-10 microns thick.

13. The capacitor as defined in claim 1, wherein the holes or elongated orifices are substantially perpendicular to the separator and the cross-sectional area of the holes or elongated orifices is substantially the same through the entire electrode material thickness.

14. The capacitor as defined in claim 13, wherein the holes or elongated orifices are circular or rectilinear in shape.

15. A method of manufacturing an electrochemical capacitor comprising the steps of:
    creating at least two electrodes formed of a porous carbonaceous material and capable of being impregnated with a liquid electrolyte,
    forming a plurality of holes or elongated orifices through said porous carbonaceous material of said electrodes, wherein the holes or elongated orifices are spaced apart less than 25.4 microns to create a facilitated pathway for travel of the electrolytic ions through the electrode thickness during charging and discharging of the capacitor thereby significantly increasing the operational frequency of the capacitor, and the spacing of the holes or elongated orifices are configured to reduce the ionic impedance of the porous carbonaceous material within the electrode material thickness,
    positioning a first side of each electrode on opposite sides of a separator constructed of a porous electrically insulating material, and
    attaching an electrically conductive current collector on a second side of each of the electrodes,
    wherein the holes or elongated orifices are patterned using a mesh placed on top of the porous carbonaceous material during their forming process; and
    wherein (i) the mesh is made of an insulating material and forms the separator in the completed electrochemical capacitor, or (ii) the mesh is made of a conducting material and forms a current collector in the completed electrochemical capacitor.

16. The method as defined in claim 15, wherein said forming step comprises lasing, anisotropic etching, reactive ion etching, or ion milling said holes or elongated orifices through said electrodes.

17. The method as defined in claim 15, wherein the holes or elongated orifices are patterned using photolithography.

18. The method as defined in claim 15, wherein the mesh that is used for forming the holes or elongated orifices is also (i) used as a supporting substrate for deposition of the porous carbonaceous material to create the electrodes, and/or (ii)

used as a mask for patterning the deposition of the porous carbonaceous material onto the current collectors.

19. A method of manufacturing an electrochemical capacitor comprising:
- providing at least two electrodes formed of a porous carbonaceous material and capable of being impregnated with a liquid electrolyte, and
- forming a plurality of holes or elongated orifices through said porous carbonaceous material of said electrodes,
- wherein the length/width or diameter of the holes or the width of the elongated orifices are larger than an interparticle pore size in the electrode material,
- wherein the holes or elongated orifices are spaced apart less than 25.4 microns to create a facilitated pathway for travel of the electrolytic ions during charging and discharging of the capacitor thereby significantly increasing the operational frequency of the capacitor, and
- the spacing of the holes or elongated orifices are configured to reduce the ionic impedance of the porous carbonaceous material within the electrode material thickness.

* * * * *